United States Patent [19]

Gelbe et al.

[11] 3,720,647

[45] March 13, 1973

[54] PRODUCING P-XYLENE

[75] Inventors: Horst Gelbe; Karl Schmid, both of Essen, Germany

[73] Assignee: Fried, Krupp, Gesellschaft mit beschrankter Haftung, Essen, Germany

[22] Filed: July 8, 1970

[21] Appl. No.: 53,284

[30] Foreign Application Priority Data

July 9, 1969 Germany.....................P 19 34 721.8

[52] U.S. Cl. .............................................260/674 A
[51] Int. Cl................................................C07c 7/14
[58] Field of Search..................................260/674 A

[56] References Cited

UNITED STATES PATENTS

| 2,695,323 | 11/1954 | Arnold | 260/674 |
|---|---|---|---|
| 2,780,663 | 2/1957 | Gunness | 260/674 |
| 3,177,265 | 4/1965 | Lammers | 260/674 |
| 2,614,134 | 10/1952 | Powers | 260/674 |
| 2,795,635 | 6/1957 | McBride | 260/674 |
| 3,038,789 | 6/1962 | Bennett et al. | 260/666 |

Primary Examiner—Delbert E. Gantz
Assistant Examiner—C. E. Spresser
Attorney—Spencer and Kaye

[57] ABSTRACT p-Xylene having a purity of more than 99 percent, preferably more than 99.5 percent by weight is produced from a liquid hydrocarbon mixture (containing approximately 15 to 25 percent by weight p-xylene and, in addition, at least one further isomeric xylene) by crystallization above the eutectic point, subsequent filtration and subsequent centrifuging.

11 Claims, No Drawings

PRODUCING P-XYLENE

BACKGROUND OF THE INVENTION

Catalytically reformed petroleum naphtha provides a mixture of xylenes and ethyl benzene. The mixture may be either an extracted and distilled product or a heart cut. p-Xylene is recovered from this mixture. The main use of p-xylene is as raw material for the production of fiber intermediates, such as terephthalic acid and its dimethyl ester (DMT). For the manufacture of terephthalic acid (TPA) and DMT, the market desires a quality of product in excess of 99 percent purity to obtain better yields and higher quality products. At present it is not profitable to market a p-xylene with a purity less than 99 percent.

p-Xylene has been separated from mixtures of liquid hydrocarbons. Generally, p-xylene is crystallized from a mixture of hydrocarbons containing 15 to 25 percent by weight of p-xylene at temperatures from minus 60° to minus 80°C and the mother liquor is separated by filtering or centrifuging. The thus developed crystallization product has a p-xylene content of up to 70–85 percent by weight. A cleansing stage then follows.

Greater composition purity can be realized, for example, by multiple-stage recrystallization or multiple-stage washing with a p-xylene solution which is more concentrated than the average composition. It is also customary to press p-xylene through a snail press or to wash it in low-boiling hydrocarbon. All of these processes, however, require large investments since they either employ a plurality of identical assemblies, as do the multi-stage processes, or they require expensive apparatus, as in the case of the use of pulsating columns. When washing a p-xylene crystallization product with low-boiling hydrocarbons, a portion of the p-xylene is dissolved in the washing agent and must be recovered therefrom. Moreover, additional process steps are required for separating materials used for the washing process, from the purified p-xylene.

To produce greater purities, it is possible, for example, to connect a centrifuge to a filter. According to the present state of the art, however, the p-xylene crystals must have a minimum size before a centrifuge can be used; for gap widths between screen rods can not be arbitrarily decreased in a centrifuge and, generally, gap widths of about 100 microns ($\mu$) are considered to be the lower limit for technical application. In order to keep the turnover of cystallization products through the screen rods of a centrifuge within acceptable limits, it has thus far been necessary to connect intermediate stages ahead of the centrifuge so that the crystals of the filter cake, which are generally smaller than 30 $\mu$, can be brought to the required minimum size (generally more than 100 $\mu$) for use in the centrifuge.

Such intermediate stages include suspending crystal with longer periods of dwell, recrystallizing, melting and recrystallizing, as well as arranging dwell period vessels for ripening of the crystals. Intermediate stages of this and similar types which enhance crystal growth are disclosed, inter alia, in German Pat. No. 831,545 and in German Published Pat. application No. 1,116,205.

Greater purity of crystal cake is achieved in a single-stage filtering process wherein the crystals grow together to form larger units within the filter cake. In this process the starting mixture is crystallized at a low temperature and, subsequently, the mother liquor is separated on a filter by driving an inert medium through the filter cake to dislodge the mother liquor from the crystals of the filter cake.

CROSS REFERENCE TO RELATED APPLICATION

This application is related to copending application Ser. No. 787,735 filed Dec. 30, 1968, now abandoned, for PURIFICATION OF PARAXYLENE.

SUMMARY OF THE INVENTION

An object of this invention is to isolate p-xylene from mixtures thereof with at least one isomeric xylene.

Another object is to obtain isolated p-xylene in a purity of more than 99 percent by weight.

A further object is to effect the isolation at minimal cost in a minimum number of steps and with a minimum investment in equipment.

These objects and others are accomplished by producing p-xylene having a purity of more than 99 percent, preferably more than 99.5 percent, by weight, from a liquid hydrocarbon mixture containing approximately 15 to 25 percent by weight p-xylene and, additionally, at least one further isomeric xylene, by crystallization above the eutectic point, subsequent filtration and subsequent centrifuging.

p-Xylene crystals (produced according to the above-mentioned filtering process by driving an inert medium therethrough so that they are almost completely free of the mother liquor and have grown together to form larger units within the filter cake) are fed into the centrifuge without any further intermediate treatments for enhancing crystal growth. Since the crystals have grown into larger units on the filter, the passage of p-xylene crystals through the screen rods of the centrifuge remains slight.

DETAILS

The present invention is not restricted to a single operating procedure; a considerable variation in details and particular manipulation is possible and is provided for.

In one advantageous embodiment of the present invention the filter cake with the p-xylene crystals in larger units is brought into the centrifuge in almost solid form. According to a further embodiment p-xylene crystals forming the filter cake are temporarily caused to form a flowable suspension for movement into the centrifuge. By temporarily suspending the crystals, the movement of the crystals into the centrifuge is facilitated.

To transform the filter cake into a flowable suspension, a mixture of xylene isomers provides a suitable medium.

In a further and particularly advantageous embodiment the mother liquor from the centrifuge is used for suspending the crystals.

As a result of the method of operation described in detail in copending application Ser. No. 787,735, filed Dec. 30, 1968, particularly because of the high air speeds of more than 130 $Nm^3/m^2$ filter surface an hour and due to the compression by rollers agglomerates are formed which have an average size of 120$\mu$.

In order to enhance the growing together of the crystals into larger units in the filter cake, the filter cake is advantageously compressed by mechanical means, for example by pressing together with rollers. The pressing of the cake is accomplished during the passage of the inert medium.

The centrifuging is advisedly done with the addition of highly concentrated p-xylene as rinsing liquid. The amount of p-xylene used for rinsing is between 5 and 25 percent by weight of the quantity of p-xylene crystals taken out of the centrifuge. It is sprayed on and has a temperature of between 14° and 18°C. The concentration of such highly concentrated p-xylene varies from, e.g., 99.0 to 99.8 percent by weight; and is preferably at least 99.5 percent by weight.

For centrifuging, sieve-worm centrifuges with a sieve spacing of 100 microns are preferred.

The inert medium employed to dislodge mother liquor from filter cake crystals is any of numerous liquids (freezing point at most +10°C) or gases which are inert with respect to and are not solvents for p-xylene over an operating temperature range of from −40°C to +60°C. Illustrative inert media include air, nitrogen and aqueous solutions of inorganic and/or organic materials, such as sodium chloride, calcium chloride and methanol. Other inert media satisfying these conditions are well known and readily available. These media may be used individually or in any combination or proportions of two or more.

The eutectic temperature of starting mixtures is ordinarily between −60° and −80°C, and the crystallization temperature is from 2° to 5°C above the eutectic temperature. Further details concerning crystallization, filtering, compressing and dislodging mother liquor are provided in copending application Ser. No. 787,735, filed Dec. 30, 1968.

The p-xylene crystals of a filter cake through which an inert medium flows for the purpose of removing the mother liquor in most cases have a purity of between 80 and 95 percent by weight. Purities of more than 99.5 percent by weight on a filter are realized in a single filter stage by removing the mother liquor from the crystals.

A substantial advantage of the present invention over an initial production of p-xylene of a purity of more than 99.5 percent by weight on a single filter is that the process of the present invention requires little energy.

When compared with other two-stage processes, particularly those wherein a filter and subsequent centrifuge are employed, there is the particular advantage of low investment costs, since intermediate steps for increasing the crystal size are eliminated. The process of the present invention can be operated continuously as well as discontinuously.

In the following examples, which are entirely illustrative in nature and in no way limitative, all parts and percentages are by weight and all temperatures are in degrees centigrade.

EXAMPLE 1

On a rotary cell filter of conventional construction for experimental purposes having a filter surface of 0.5m² crystals were separated from filtrate of a suspension of p-xylene crystals in a liquid $C_8$-aromatics mixture in the form of a filter cake; remaining mother liquor was removed by blowing air as inert medium through the filter cake. The suspension had a temperature of −65°C and a p-xylene content of 23 percent by weight. The mixture also contained 15 percent ethyl benzene, 42 percent m-xylene and 20 percent o-xylene. More than half of this (13 percent by weight) was present in crystal form. The crystallization was performed in a scraper cooler. The filter cake, after emergence from the suspension, was 25 mm thick and covered 0.275m² of the filter surface. The period of dwell of the p-xylene crystals in the air current was 9 minutes, taken from the emergence from the suspension until removal from the filter by means of a stripper. The air driven through the cake was circulated and had a temperature of 15°C when it entered the filter. The amount of air was 225 Nm³/h per m² of filter cake surface. The cake was compressed by a freely rotating Teflon-covered roller to a thickness of approximately 20mm. The removed filter cake was 99.2 percent by weight p-xylene. The filtrate contained 14.2 percent by weight of p-xylene.

The cake removed from the filter initially fell into a vessel and was fed in charges by means of a snail in almost solid form to a sieve-worm centrifuge having a sieve spacing of 100μ, pure liquid p-xylene having concentrations of more than 99 percent being added to the crystals in the transporting snail shortly before its entrance into the centrifuge. Due to the high purity of the filter cake, further washing in the centrifuge was not necessary. The product extracted from the centrifuge had a purity of 99.8 percent p-xylene. The operating temperature in the centrifuge was approximately +5°C.

EXAMPLE 2

The procedure of Example 1 was followed except as otherwise specified. Instead of air, nitrogen was used. The period of dwell of the crystals in the nitrogen stream was 4 minutes; the amount of nitrogen, 120 Nm³/h per m². The purity of the filter cake was 96.0 percent by weight of p-xylene.

The cake removed from the filter was mixed in a vessel with a mixture of xylene isomers (approximately 70 percent p-xylene, the rest m-xylene, o-xylene and ethyl benzene) at a temperature of −5°C and was put into the centrifuge immediately thereafter. The solids content was approximately 30 percent by weight; the p-xylene content of the suspension was approximately 80 percent by weight. Without the addition of washing liquid in the centrifuge, the p-xylene content of the product was 99.1 percent p-xylene. After washing with pure p-xylene, i.e., having a purity of more than 99.0 percent by weight, cake purities of more than 99.5 percent by weight were obtained. For the washing liquid 15 percent (by weight) of the amount of crystals produced was used. It was sprayed onto the cake.

When, instead of the mixture of xylene isomers, the same amount of pure p-xylene, i.e., with concentrations of more than 99 percent by weight, or mother liquor from the centrifuge which contains approximately 85 percent by weight of p-xylene is used for the suspension, the purity of the product is correspondingly higher.

Replacing the compression with a roller with other modes of mechanical compression, e.g., stampers which are lifted by a cam shaft and which compress the cake in a uniform time pattern, yields similar results.

It will be understood that the above description of the present invention is susceptible to various modifications, changes and adaptations, and the same are intended to be comprehended within the meaning and range of equivalents of the appended claims.

We claim:

1. A process for obtaining p-xylene with a purity in excess of 99 percent by weight from a flowable hydrocarbon mixture containing a plurality of xylenes and comprising from about 15 to about 25 percent by weight of p-xylene by a) crystallizing the hydrocarbon mixture above its eutectic point, b) filtering the crystallized product to obtain filter cake, c) passing inert medium through the filter cake while filtering to remove mother liquor from the filter cake and to form enlarged units of p-xylene crystals, d) transmitting the resulting filter cake with the enlarged units of p-xylene crystals to a centrifuge and e) centrifuging said resulting filter cake with said enlarged units of p-xylene crystals in the centrifuge.

2. A process according to claim 1 for obtaining p-xylene with a purity in excess of 99 percent by weight from a liquid hydrocarbon mixture containing a plurality of xylenes and comprising from about 15 to about 25 percent by weight of p-xylenes by a) crystallizing the hydrocarbon mixture above its eutectic point, b) filtering the crystallized product to obtain filter cake, c) passing inert medium through the filter cake while filtering to remove mother liquor from said filter cake and to enhance crystal growth of crystalline p-xylene in said filter cake and thus increase the size of crystal units formed d) mechanically compressing crystalline p-xylene in the filter cake to agglomerate p-xylene crystals into larger crystal units, e) transmitting the resulting filter cake with the larger crystal units to a centrifuge and f) centrifuging said resulting filter cake with said larger crystal units in the centrifuge without any further intermediate treatment for enhancing crystal growth.

3. A process according to claim 1 wherein the thus enlarged units of p-xylene crystals in the filter cake are transmitted to the centrifuge without any further intermediate treatment for enhancing crystal growth.

4. A process according to claim 1 wherein the p-xylene filter cake crystals are transmitted into the centrifuge in the form of a flowable suspension.

5. A process according to claim 4 wherein the flowable suspension comprises a suspension medium consisting essentially of a mixture of xylene isomers.

6. A process according to claim 4 wherein mother liquor extracted during centrifuging is suspension medium for the flowable suspension.

7. A process according to claim 1 wherein the thus-enlarged units of p-xylene crystals in the filter cake are mechanically compressed to enhance the formation of even larger units.

8. A process according to claim 7 wherein the mechanical compression is effected with rollers.

9. A process according to claim 1 wherein solids retained in the centrifuge are rinsed during centrifuging with highly concentrated liquid p-xylene.

10. A process according to claim 2 for obtaining p-xylene with a purity in excess of 99.5 percent by weight.

11. A process according to claim 2 wherein filtering is effected in a rotary cell filter.

* * * * *